United States Patent
Suzuki et al.

(10) Patent No.: US 7,104,850 B2
(45) Date of Patent: Sep. 12, 2006

(54) LOW INSERTION-FORCE CONNECTOR TERMINAL, METHOD OF PRODUCING THE SAME AND SUBSTRATE FOR THE SAME

(75) Inventors: Kyoko Suzuki, Shizuoka (JP); Minoru Ikeda, Shizuoka (JP); Tomohiro Shimada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/203,223

(22) Filed: Aug. 15, 2005

(65) Prior Publication Data

US 2006/0040569 A1 Feb. 23, 2006

(30) Foreign Application Priority Data

Aug. 18, 2004 (JP) ............................. 2004-238364

(51) Int. Cl.
*H01R 13/02* (2006.01)

(52) U.S. Cl. ..................................................... 439/886

(58) Field of Classification Search ................. 439/886
See application file for complete search history.

(56) References Cited

U.S. PATENT DOCUMENTS

| | | | | |
|---|---|---|---|---|
| 5,650,088 | A * | 7/1997 | Kodama ...................... 508/257 |
| 5,853,797 | A * | 12/1998 | Fuchs et al. .................. 427/58 |
| 5,925,417 | A * | 7/1999 | Fousse ......................... 427/352 |
| 5,967,860 | A * | 10/1999 | Ricketts et al. ............. 439/886 |
| 6,102,521 | A * | 8/2000 | Halko et al. ................... 347/47 |
| 6,183,885 | B1 * | 2/2001 | Nakamura et al. ........... 428/647 |
| 6,625,004 | B1 * | 9/2003 | Musolf et al. ............... 361/278 |
| 6,627,329 | B1 * | 9/2003 | Shintani ..................... 428/624 |
| 6,733,835 | B1 * | 5/2004 | Fryxell et al. ............... 427/299 |
| 6,890,599 | B1 * | 5/2005 | Buchwalter et al. ........ 427/272 |
| 6,923,692 | B1 * | 8/2005 | Niebauer .................... 439/886 |
| 2001/0008709 | A1 * | 7/2001 | Asakura et al. ............. 428/647 |
| 2002/0164419 | A1 * | 11/2002 | Fukushima et al. ...... 427/248.1 |
| 2002/0197879 | A1 * | 12/2002 | Fukushima et al. ......... 438/758 |
| 2003/0077952 | A1 * | 4/2003 | Steenkiste et al. .......... 439/886 |
| 2003/0113229 | A1 * | 6/2003 | Briones et al. ............... 422/57 |
| 2004/0180506 | A1 * | 9/2004 | Ramanath et al. .......... 438/343 |
| 2004/0203192 | A1 * | 10/2004 | Gracias ..................... 438/118 |
| 2005/0120550 | A1 * | 6/2005 | Cheng et al. ................. 29/825 |
| 2005/0186347 | A1 * | 8/2005 | Kim et al. ............... 427/372.2 |

FOREIGN PATENT DOCUMENTS

| | | |
|---|---|---|
| JP | 5-121128 | 5/1993 |
| JP | 11-317253 | 11/1999 |
| JP | 2001-237026 | 8/2001 |
| JP | 2001-257022 | 9/2001 |
| JP | 2002-88496 | 3/2002 |
| JP | 2002-110276 | 4/2002 |
| JP | 2002-280112 | 9/2002 |

* cited by examiner

*Primary Examiner*—Ross Gushi
(74) *Attorney, Agent, or Firm*—Armstrong, Kratz, Quintos, Hanson & Brooks, LLP

(57) ABSTRACT

The present invention is to provide low insertion-force connector terminals. A self-assembled monolayer is deposited on the surface of the connector terminals. The deposited connector terminals do not require a special lever for adjusting contact pressure. The connector terminals are easily manufactured without cost-up and made small size. They do not increase contact resistance and they are easily connected to each other with low insertion force so that they are applied to the connectors of vehicles.

6 Claims, 11 Drawing Sheets

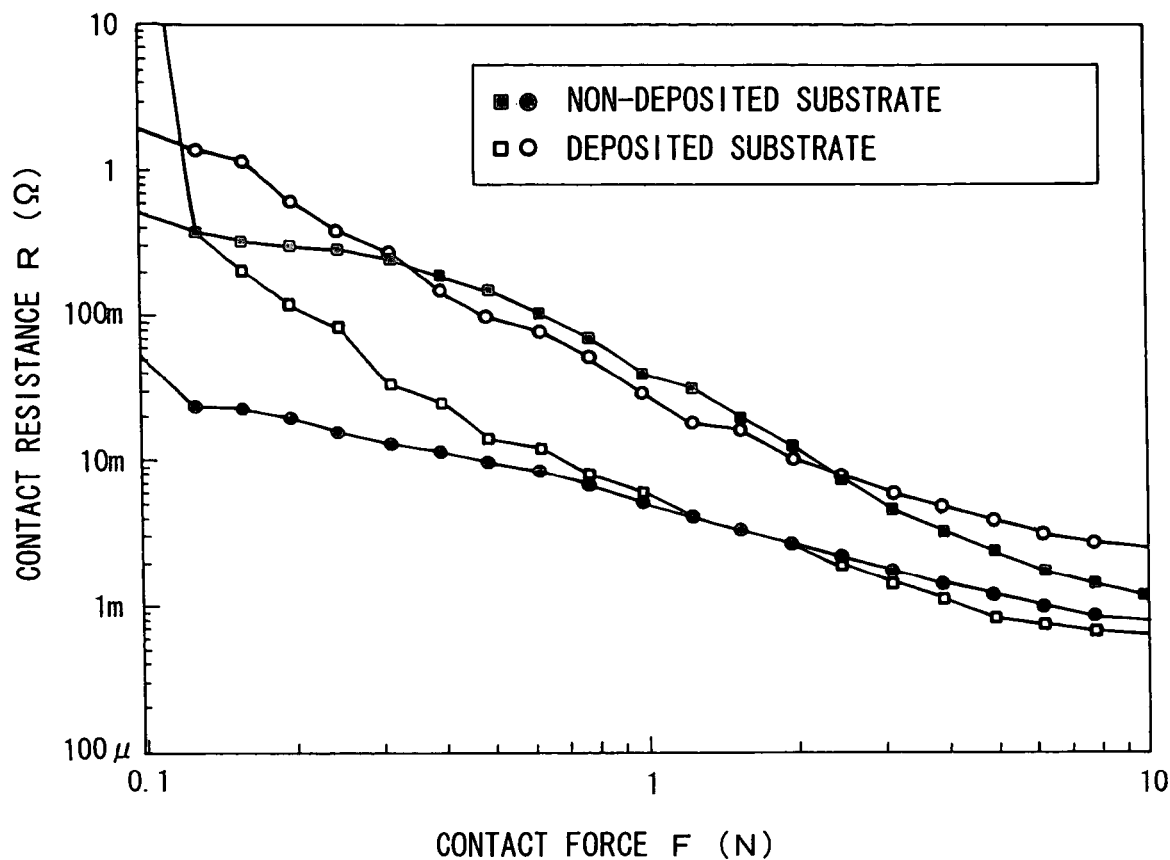
F I G. 5
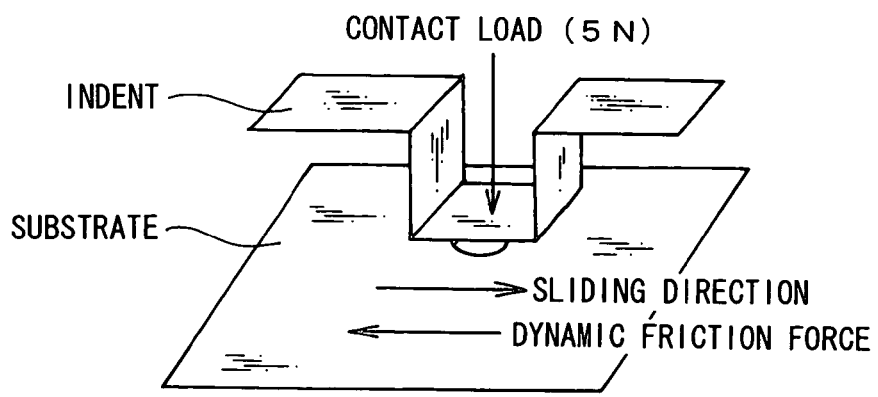
F I G. 6

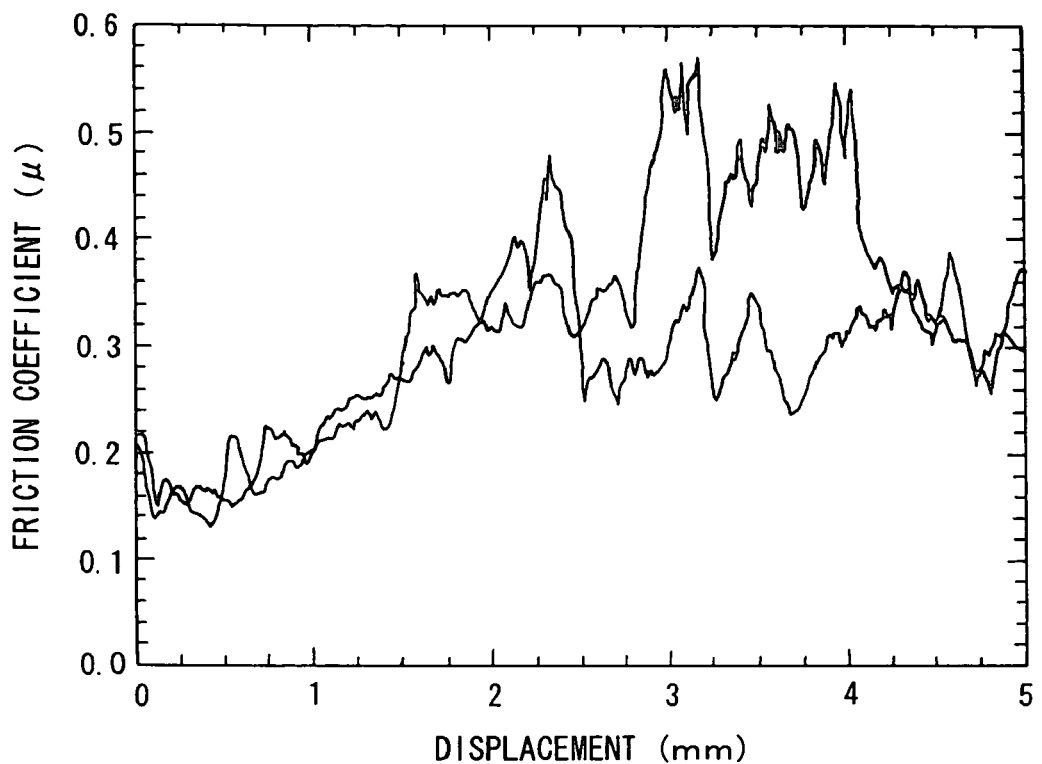
F I G. 7A
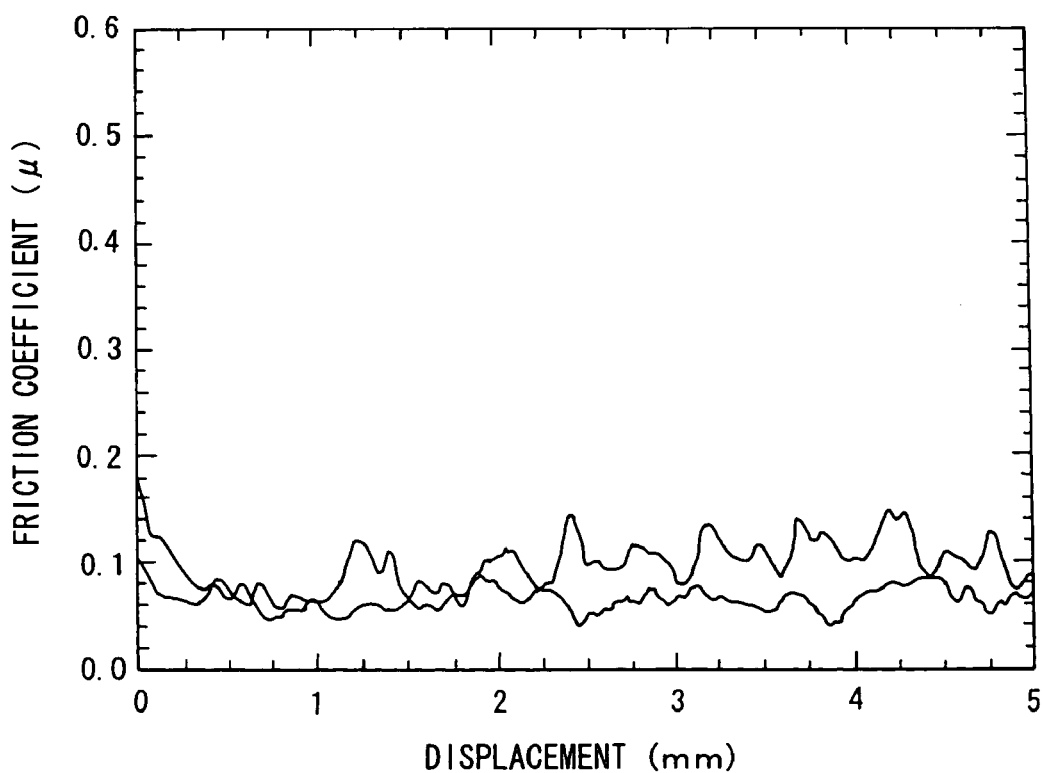
F I G. 7B

LOW INSERTION-FORCE CONNECTOR TERMINAL, METHOD OF PRODUCING THE SAME AND SUBSTRATE FOR THE SAME

BACKGROUND OF THE INVENTION

1. Field of the Invention

The present invention relates to a low insertion-force connector terminal, a method of producing the same and a substrate for the same.

2. Description of the Related Art

High performances of electric instruments and diversification of vehicle instruments request more connector terminals.

This causes a large force to connect the connectors. It is then required to reduce the force to connect them.

JP-2002-110276-A, JP-2001-257022-A and JP-H05-121128-A disclose a force reduction of terminal springs to reduce a contact force. However, this causes an increase of a contact resistance.

JP-2002-280112-A and JP-2001-237026-A disclose a connector, which is pressed with a lever after connecting the connectors each other with low pressing force. However, this causes an increase of cost.

In order to reduce a sliding friction, a lubricant agent such as oil is applied to or a multilayer plating is formed on a sliding surface of a connector terminal. However, these methods do not give sufficient effects but cause an increase of cost.

JP-2002-088496-A and JP-H11-317253-A disclose an application of $MoS_2$ lubricant coating on a sliding surface of a connector terminal. However, this causes an increase of contact resistance.

SUMMARY OF THE INVENTION

An object of the present invention is to provide a low insertion-force connector terminal. The terminal is easily manufactured and connected with another terminal by a significantly low force without use of an adjusting lever. This terminal does not cause an increase of contact resistance.

According to an embodiment of the present invention, a low insertion-force connector terminal has a self-assembled monolayer on a sliding surface thereof.

According to an embodiment of the present invention, a method of producing a low insertion-force connector terminal includes a step of forming a self-assembled monolayer on a sliding surface thereof.

According to a further embodiment of the present invention, a substrate for a low insertion-force connector terminal has a self-assembled monolayer on a sliding surface thereof.

BRIEF DESCRIPTION OF THE DRAWINGS

FIG. 5 shows a change of contact resistance with respect to contact force for the deposited substrate A and the non-deposited substrate of Example 1;
FIG. 6 illustrates a method to measure friction resistance;
FIG. 7A shows friction coefficient with respect to displacement for the non-deposited substrate of Example 1, the measurement being made twice;
FIG. 7B shows friction coefficient with respect to displacement for the deposited substrate of Example 1, the measurement being made twice.

DETAILED DESCRIPTION OF THE PREFERRED EMBODIMENTS

Figure 1:
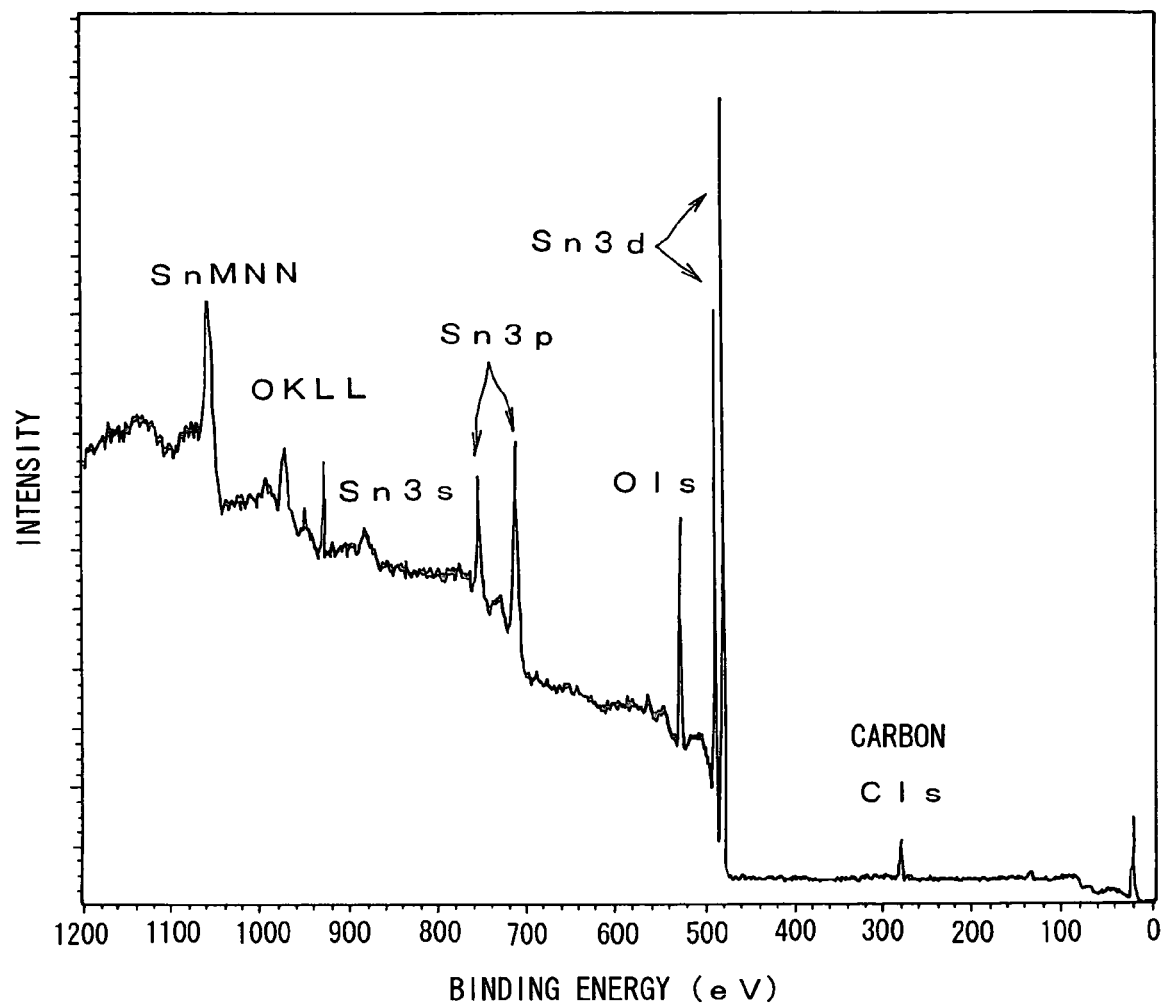
FIG. 1 shows XPS spectra of a non-deposited substrate.
Figure 2A:
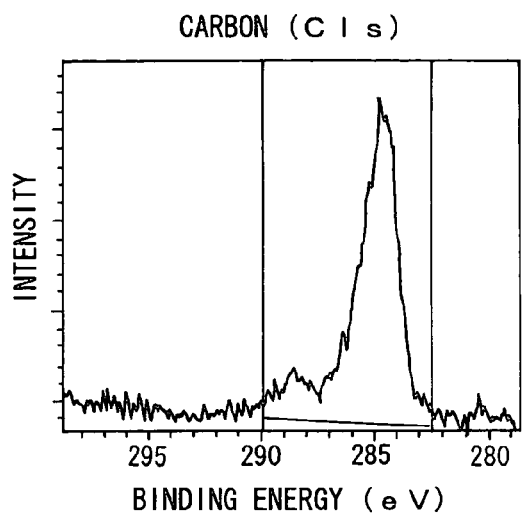
FIG. 2A shows expanded spectra of carbon C1s peak.
Figure 2B:
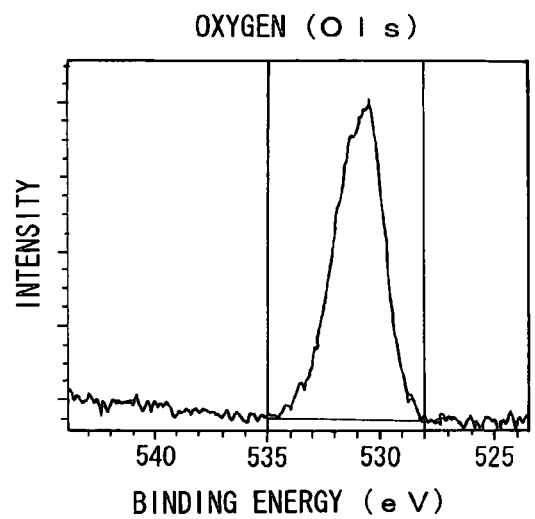
FIG. 2B shows expanded spectra of oxygen O1s peak.
Figure 2C:
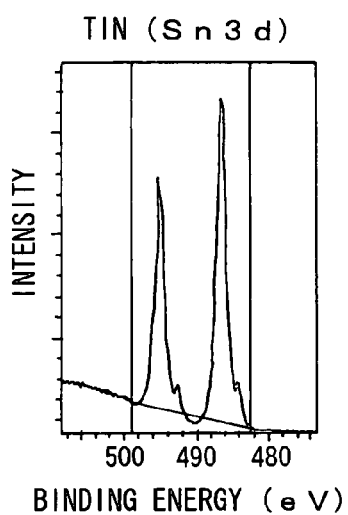
FIG. 2C shows expanded spectra of tin Sn3d peak.
Figure 2D:
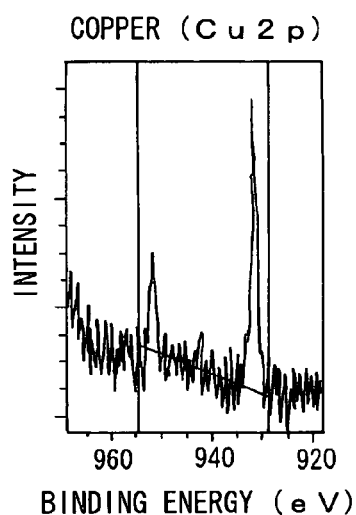
FIG. 2D shows expanded spectra of copper Cu2p peak
Figure 2E:
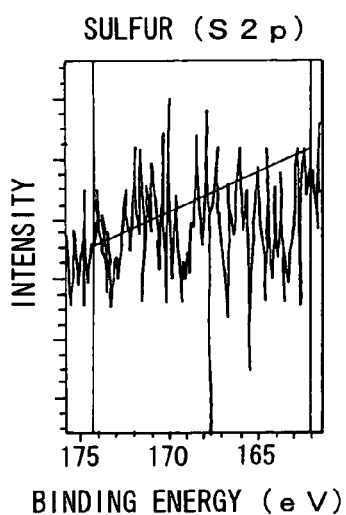
FIG. 2E shows expanded spectra of sulfur S2p peak.

A self-assembled monolayer of the present invention is formed on a connector terminal surface by means of a chemical bonding of organic molecules with metals of the terminal surface. The organic molecule is monolayer and consists of oriented molecules with Van der Waals force. The self-assembled monolayer is dense and strong and gives a low friction resistance and high surface protection.

The self-assembled monolayer is formed at least on a sliding surface of the connector terminal metal such as copper, including copper alloy, gold, silver, tin, or plating thereof.

A substrate of copper or copper alloy, which is cheap and high conductive, is utilized and a tin layer is formed on the surface of the substrate with plating. The oxide film of the tin layer is thin and easily peeled off so that a fresh metallic surface is easily obtained.

When the sliding surface of the terminal metal is soiled, oxidized or sulfurized, the formation of the self-assembled monolayer is greatly affected so that a cleaning is necessary to remove the metallic oxide and sulfide. Acid solutions, such as sulfuric, hydrochloric, and nitric acid, are utilized for cleaning.

The tin oxide film is stronger (more dense) than that of copper oxide so that it is desirable to use nitric acid for cleaning the surface containing tin. Other acids than nitric acid can hardly remove oxides. They generate by-products after removing the oxides and cause an increase of surface roughness. The by-products prevent the formation of the self-assembled monolayer so that the friction reduction is prevented.

For cleaning the tin surface, it is desirable to use a concentration of the nitric acid of 13 wt % to 17 wt % with the cleaning time of 8 to 13 seconds. It is desirable to stir the solution while cleaning the tin surface. Under this condition, the best state of the tin surface is provided for forming the self-assembled monolayer.

In addition, at least one cleaning method selected from a solvent, water, or alkaline liquid can be combined before and after the acid cleaning process.

When the sliding surface is formed with gold, platinum or palladium, which hardly forms oxide or sulfide at the surface thereof, it is possible to omit the cleaning. However, rust such as organic matters are adhered to the metal surface, it is desirable to clean the surface before producing the self-assembled monolayer to avoid adverse effect on the properties of the monolayer, for example orientation.

Organic molecules to form the self-assembled monolayer on the metal surface include adsorption functional groups. Specific adsorption functional groups are thiol organic matter ($R_1SH$) with thiol radical, disulfide compound ($R_1SSR_2$) with disulfide radical, and sulfide compound ($R_1R_2$) with sulfide radical. Here, $R_1$ and $R_2$ are straight-chain hydrocarbon group such as —$(CH_2)_nCH_3$, fluorine substitution hydrocarbon group such as —$(CH_2)_nCF_3$, —$(CH_2)_nCF_3$—$(CH_2)_n(CH_2)_mCF_3$, where fluorine substitutes at least one hydrogen in the hydrocarbon group, carboxyl substitution hydrocarbon group such as —$(CH_2)_nCOOH$, where carboxyl group substitutes at least one hydrogen in the hydrocarbon group, amino substitution hydrocarbon group such as —$(CH_2)_nNH_2$, where amino group substitutes at least one hydrogen in the hydrocarbon group, or hydroxyl substitution hydrocarbon group such as —$(CH_2)_nCH_2OH$, where hydroxyl group substitutes at least one hydrogen in the hydrocarbon group. Here, n and m are natural numbers of equal or more than 3.

The R in the thiol organic matters ($R_1SH$) are alkyl group of —$(CH_2)_nCF_3$, fluorinated alkyl group of —$(CH_2)_nCF_3$, aliphatic carboxylic acid group of —$(CH_2)_nCOOH$, and aliphatic alcohol group of —$(CH_2)_nCH_2OH$ where n is natural number of equal or more than 3.

Such the thiol organic matter is dissolved in an alcoholic solvent, such as ethanol, methanol, and isopropyl alcohol to obtain a thiol-alcoholic solution. The sliding portion of the terminal is immersed into or applied with the solution to form the self-assembled monolayer on the surface of the connector terminal.

Besides the immersing method, the self-assembled monolayer can be formed with vapor deposition by exposing the sliding portion of the connector terminal to the vapor of thiol organic matter.

EXAMPLE 1

Substrate

<Formation of Self-assembled Monolayer>

A tin plated copper alloy substrate (product name NB109: Dowa Mining Co., Ltd.), commonly used for connector terminal, with a thickness of 0.2 mm was utilized.

As a pretreatment, the substrate was immersed in 15 wt % nitric acid solution for 10 seconds to obtain a fresh surface of the tin metal by removing an oxide layer from the substrate surface.

An octadecanethiol (available at Aldrich Corporation) was solved into ethanol of 99.5 wt % to prepare a solution of 1 mM. The pretreated copper alloy substrate was immersed in the solution for 48 hours and cleaned in ethanol with ultrasonic cleaning.

<Evidence of Self-assembled Monolayer>

An observation of the deposited substrate A with XPS (X-ray photoelectron spectroscopy) confirmed a component of octadecanethiol on the surface of the tin plated substrate.

Figure 3:
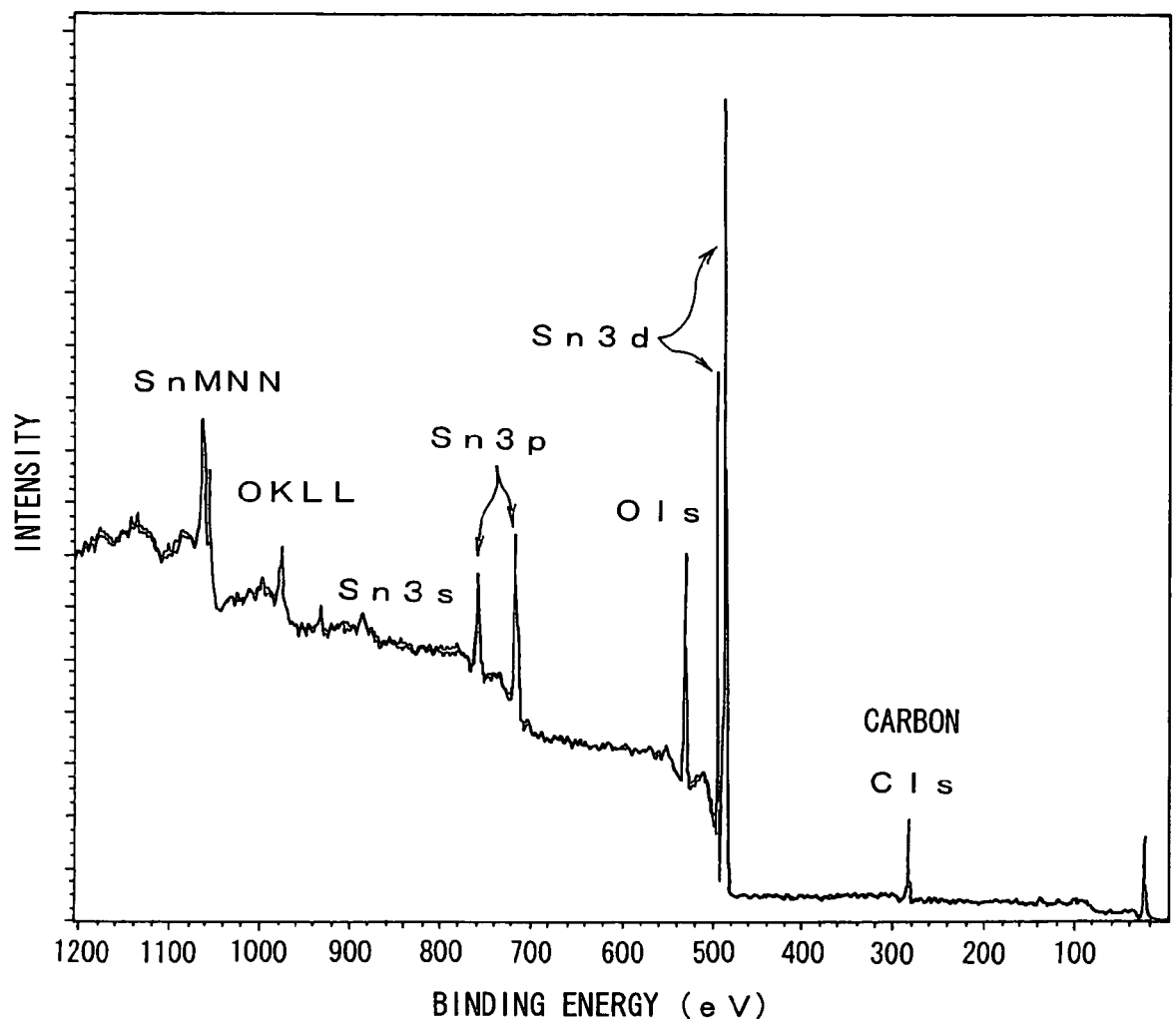
FIG. 3 shows XPS spectra of a deposited substrate of Example 1.
Figure 4A:
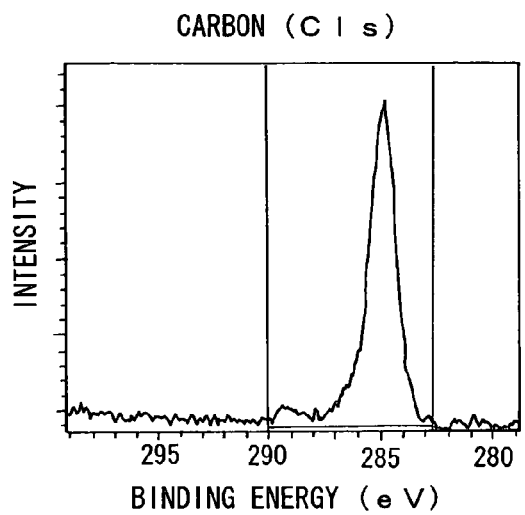
FIG. 4A shows expanded spectra of carbon C1s peak.
Figure 4B:
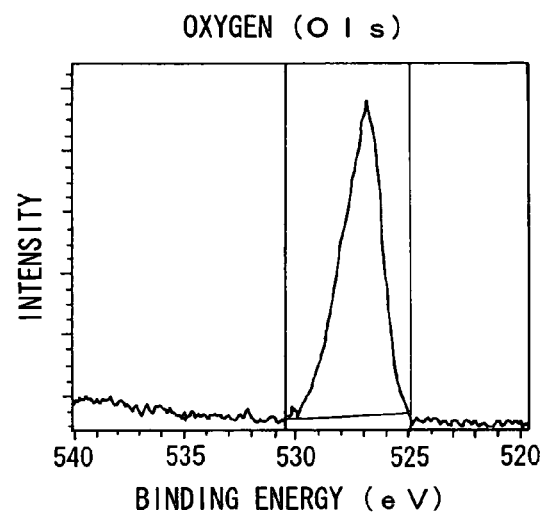
FIG. 4B shows expanded spectra of oxygen O1s peak.
Figure 4C:
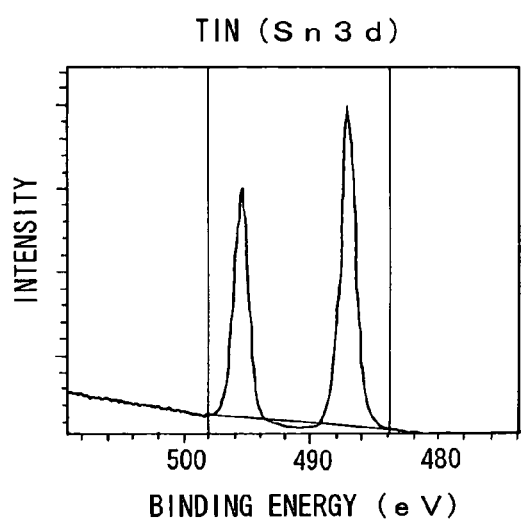
FIG. 4C shows expanded spectra of tin Sn3d peak.
Figure 4D:
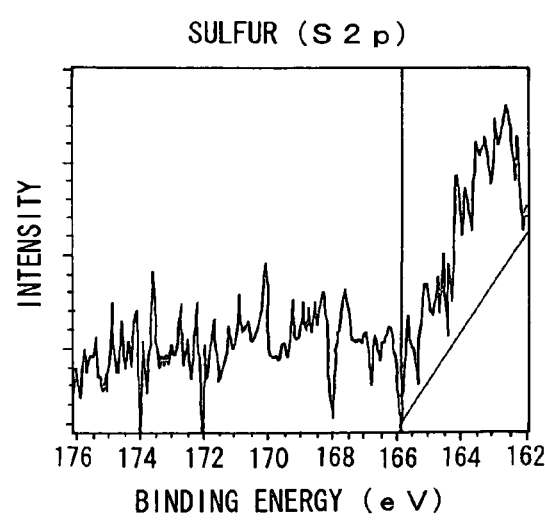
FIG. 4D shows expanded spectra of sulfur S2p peak.

FIG. 1 shows XPS spectra of the undeposited substrate, namely, only pretreated with nitric acid. FIGS. 2A to 2E show expanded spectra of carbon C1s peak (FIG. 2A), oxygen O1s peak (FIG. 2B), tin Sn3d peak (FIG. 2C), copper Cu2p peak (FIG. 2D), and sulfur S2p peak (FIG. 2E) of FIG. 1, respectively. FIG. 3 shows XPS spectra of the deposited substrate A. FIG. 4A to 4D show expanded spectra of carbon C1s peak (FIG. 4A), oxygen O1s peak (FIG. 4B), tin Sn3d peak (FIG. 4C), and sulfur S2p peak (FIG. 4D) of FIG. 3, respectively.

From the XPS observation, it was found that the self-assembled monolayer was not removed by the ultrasonic cleaning and bonded to the tin plated surface.

<Evaluation of Contact Resistance>

The contact resistance of the deposited substrate was measured and the effect to electrical properties was studied. Two samples were measured for each the non-deposited and deposited substrate. The value was compared with that of the non-deposited substrate.

The contact load of an indent to the deposited substrate A was varied from 0.098 to 9.8N and the contact resistance (R) was measured with four-probe method. The resistance was obtained from the equation of R=V/I (EQ. 1), where V is a voltage difference between the probes and I is a current applied.

FIG. 5 shows the result. The experimental condition was that contact weight: 0.098 to 9.8N, applied current (I): 10 mA, radius of indent tip: 1.0 mm. The indent is made of reflow tin plated copper alloy. The indent was cleaned well with trichloroethane prior to measurement.

As shown in FIG. 5, the contact resistance of the deposited substrate is 0.9 to 4 m$\Omega$ at the contact load of 5N, which value is a close condition of connector terminal actually used, and shows almost same value as that of the non-deposited substrate. Although the self-assembled monolayer is formed, the contact resistance is hardly changed. It is assumed that the self-assembled monolayer has a thickness of equal or less than a few dozen angstroms and a tunneling current may occur. The self-assembled monolayer does not almost affect the electrical properties and is assumed to be suitable for the application to electrical contact portions such as the connector terminal.

It was found that the friction coefficient decreased at the heavy load of 5N. This confirms the formation of a strong self-assembled monolayer having orientation between the organic molecules.

<Evaluation of Friction Coefficient>

The friction coefficient was measured on the deposited substrate A and the non-deposited substrate. For the condition as the actual use, the indent of the measurement had a contact shape same as the connector terminal. As shown in FIG. 6, a given load 5N, was applied to the substrate through the indent and the substrate was slid and the force applied to the substrate (dynamic friction force) was measured with a sliding tester (product of Yamazaki Seiki Laboratory). The friction coefficient is given by, friction coefficient=dynamic friction force/contact load (EQ. 2).

Experimental conditions are that contact weight: 5N, test speed: 24 mm/min, displacement: 5 mm (one direction and once), tin plated copper alloy indent having a semi-sphere with a radius of 1.0 mm at a contact portion with the substrate. FIG. 7A shows the result of the non-deposited substrate and FIG. 7B shows the result of the deposited substrate A.

The result shows that the deposited substrate A according to the present invention largely reduced the dynamic friction coefficient to one third of the non-deposited substrate.

EXAMPLE 2

Connectors

Figure 8:
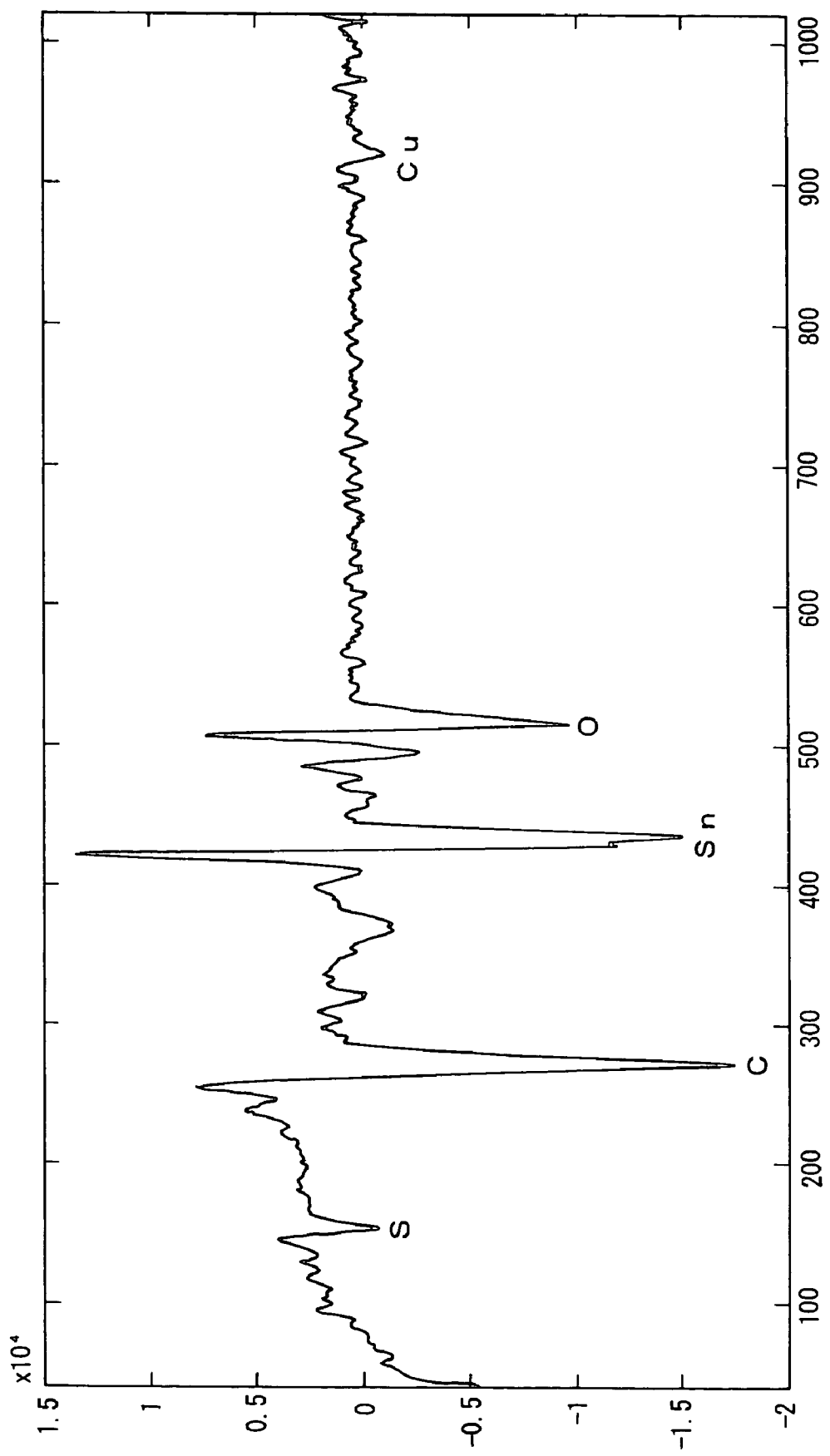
FIG. 8 shows Auger electron spectroscopy (AES) spectra for a deposited substrate of Example 2.

Eighteen male connector terminals, made of tin plated brass, and eighteen female connector terminals, made of tin plated copper alloy, were prepared. They were immersed in the 15 wt % nitric acid solution as same as the substrate and immersed in the 1 mM octadecanethiol-ethanol solution to form the self-assembled monolayer for 48 hours and were cleaned in ethanol with ultrasonic cleaning. Auger Electron Spectroscopy Analyzer (AES) confirmed the presence of sulfur component in the terminal surface as shown in spectra of FIG. 8.

The insertion force between the deposited male and female terminals was measured. Locking pins to prevent detachment of terminals each other were removed for the measurement.

EZGraph tester (product of Shimadzu Corporation) was utilized for the insertion force measurement. The female terminal attached with a load cell was moved toward the male terminal from above with a cross-head speed of 25 mm/min (compliant with JASOD 606) and connected completely. EZGraph tester measured the load change during the sliding of the terminals each other.

Figure 9:
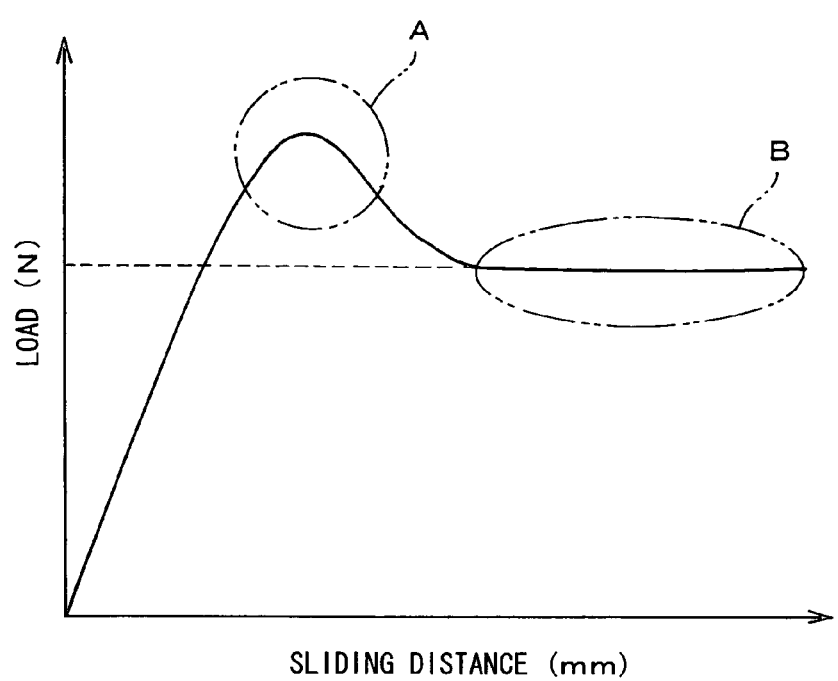
FIG. 9 shows a change of load with respect to sliding distance when conventional connectors are connected to each other.
Figure 10:
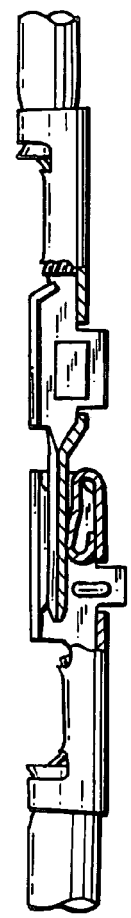
FIG. 10 shows that a tab of a male terminal is inserted into a spring of a female terminal when the conventional connectors are connected to each other.

FIG. 9 shows the load change when a conventional connector is connected. A tab of the male terminal is inserted into a spring of the female terminal as shown in FIG. 10. When the tab of the male terminal enters into the spring, the load reaches a maximum value noted as A in FIG. 9. When the tab moves further into the female terminal with sliding, the load becomes a constant value noted as B. The load at B is assumed to be correlated with the friction coefficient of the sliding portion between the male and female terminals.

Figure 11:
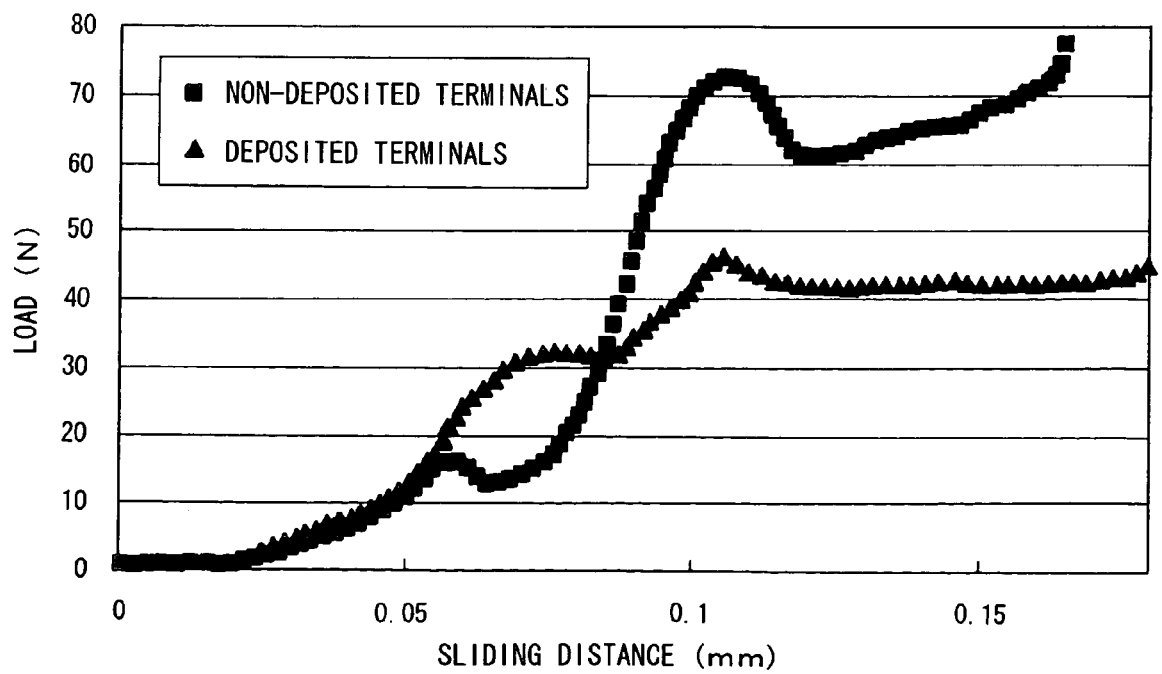
FIG. 11 is the load change when the connectors are connected to each other in Example 2.

FIG. 11 shows the results of the load change of the present invention. FIG. 11 shows a typical load change similar to that of FIG. 9. In FIG. 11, a peak close to the sliding distance of 0.1 mm is that the tab of the male terminal starts to enter into the spring of the female terminal. The constant load over the sliding distance of 0.12 mm corresponds to the load of sliding between the male and female terminals. Since the locking pin is removed for testing the terminals, the load is assumed to be constant.

FIG. 11 shows that the load value at above 0.12 mm of the deposited connector terminals, or with the self-assembled monolayer, became about two thirds of the non-deposited terminals. The present invention confirmed the reduction of the insertion force for the actual connector.

The connection of the non-deposited terminals, or without the self-assembled monolayer, shows an increase of the load above the sliding distance of 0.12 mm, while the connection of the deposited terminals shows an almost constant value. It is assumed that the self-assembled monolayer can prevent adhesion or friction of tin during the sliding of each terminal. The maximum load, near the sliding distance of 0.1 mm, where the male tab enters into the female spring, also decreases. The self-assembled monolayer has an effect to reduce a static friction coefficient related with the beginning of the sliding.

EXAMPLE 3

Substrate

A pretreatment was made with 10 wt % sulfuric acid instead of 15 wt % nitric acid of Example 1 to the copper alloy substrate (NB109: product of Dowa Mining Co., Ltd.). The other processes were the same as those of Example 1.

Figure 12A:
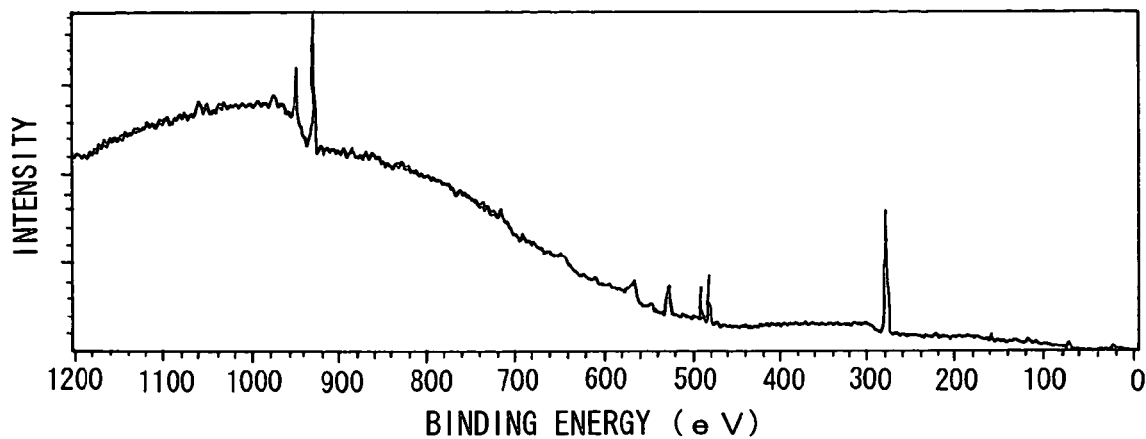
FIG. 12A shows XPS spectra of a deposited substrate of Example 3.
Figure 12B:
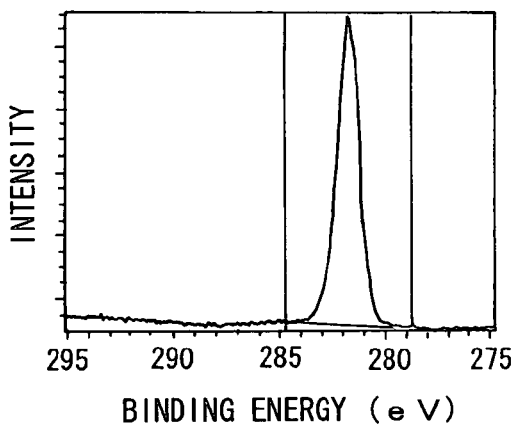
FIG. 12B shows expanded spectra of carbon C1s peak.
Figure 12C:
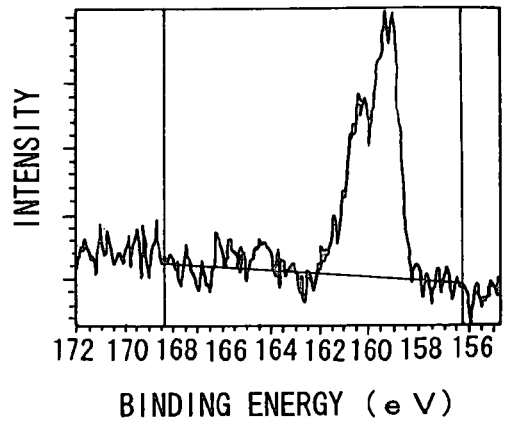
FIG. 12C shows expanded spectra of sulfur S2p peak.
Figure 13A:
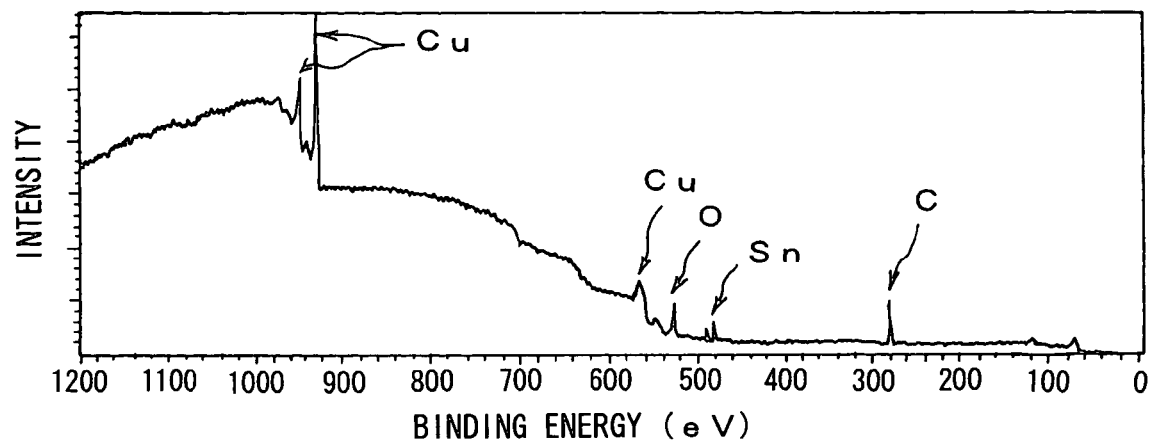
FIG. 13A shows XPS spectra of a non-deposited substrate of Example 3.
Figure 13B:
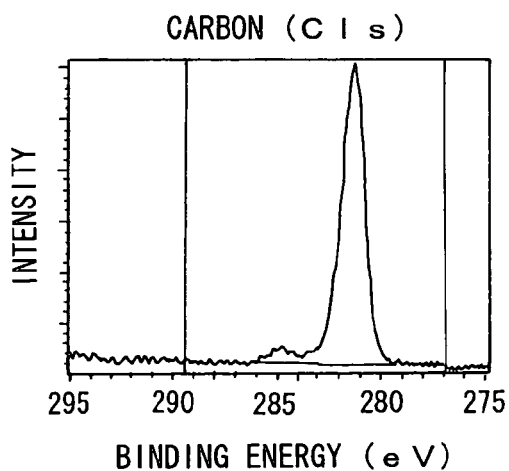
FIG. 13B shows expanded spectra of carbon C1s peak.
Figure 13C:
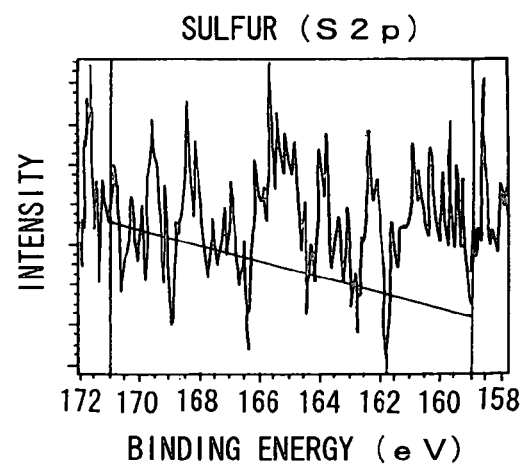
FIG. 13C shows expanded spectra of sulfur S2p peak.

FIG. 12A shows XPS spectra of the deposited substrate. FIG. 12B shows expanded spectra of carbon C1s peak and FIG. 12C shows expanded spectra of sulfur S2p peak. FIG. 13A shows XPS spectra of the non-deposited substrate. FIG. 13B shows expanded spectra of carbon C1s peak and FIG. 13C shows expanded spectra of sulfur S2p peak. The XPS observation confirmed a component of octadecanethiol on the surface of the deposited substrate.

The friction resistance was measured for these substrates with a load of 5N to the indent. The friction resistance of the deposited substrate was 0.08, while that of the non-deposited substrate was 0.17 and almost two times.

Figure 14:
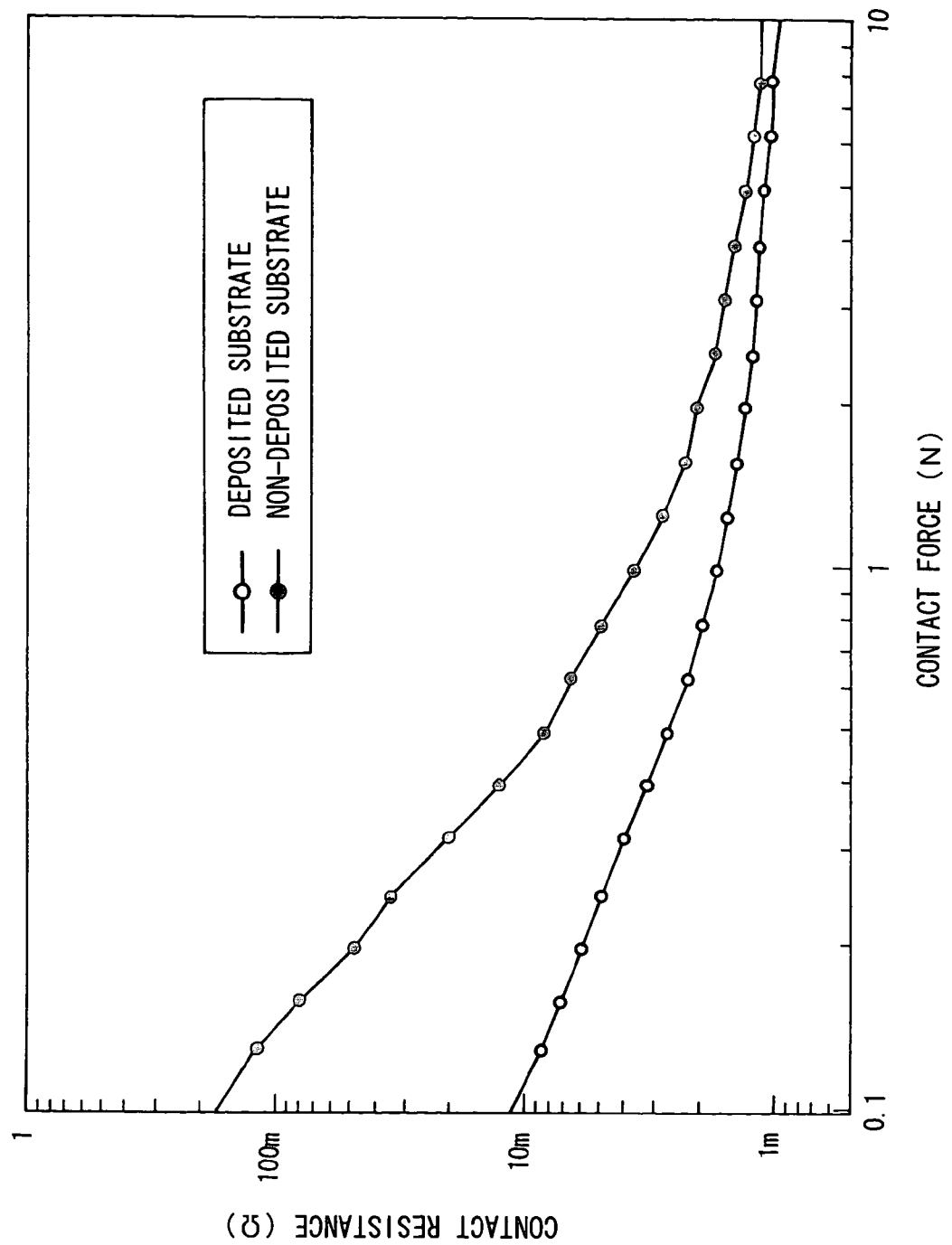
FIG. 14 shows contact resistance with respect to contact force for the deposited substrate and non-deposited substrate.

FIG. 14 shows that the friction resistance of the deposited substrate becomes 1 mΩ at the load of 5N, which is almost the same value as the non-deposited substrate.

The connector terminals according to the present invention do not require a special lever for adjusting contact pressure. They are easily manufactured without cost-up and made a small size. They do not increase the contact resistance and they are easily connected to each other with low insertion force so that they are applied to the connectors of vehicles.

What is claimed is:

1. A low insertion-force connector terminal comprising a connector terminal;
   a tin metal formed on a sliding surface of the terminal;
   a fresh surface formed on the tin metal; and
   a monolayer formed on the fresh surface,
   wherein said monolayer is formed with oriented molecules with adsorption functional groups, chemically bonded to the fresh surface of the tin metal.

2. The terminal as claimed in claim 1, wherein said sliding surface is treated with octadecanethiol to form said monolayer.

3. A method of producing a low insertion-force connector terminal, comprising the steps of:
   forming a tin metal on a sliding surface of the terminal
   forming a fresh surface on the tin metal; and
   forming a monolayer on the fresh surface of the tin metal,
   wherein said monolayer is formed with oriented molecules with adsorption functional groups, chemically bonded to the fresh surface of the tin metal.

4. The method as claimed in claim 3, further comprising a step of removing metallic oxide on the sliding surface prior to forming the bonded monolayer.

5. The method as claimed in claim 4, wherein said metallic oxide is removed by treating with acid aqueous solution.

6. A substrate for a low insertion-force connector terminal, having:
   a metal substrate;
   a tin metal formed on a sliding surface of the metal substrate;
   a fresh surface formed on the tin metal; and
   a monolayer formed on the fresh surface of the tin metal,
   wherein said monolayer is formed with oriented molecules with adsorption functional groups, chemically bonded to the fresh surface of the tin metal.

* * * * *